(12) United States Patent
Hoess et al.

(10) Patent No.: US 9,988,548 B2
(45) Date of Patent: Jun. 5, 2018

(54) PMMA PROVIDED WITH IMPACT RESISTANCE AND HAVING IMPROVED OPTICAL PROPERTIES

(71) Applicants: Werner Hoess, Messel (DE); Victor Khrenov, Frankfurt (DE); Reiner Mueller, Biebesheim (DE); Lukas Friedrich Doessel, Darmstadt (DE); Dominic Stoerkle, Darmstadt (DE)

(72) Inventors: Werner Hoess, Messel (DE); Victor Khrenov, Frankfurt (DE); Reiner Mueller, Biebesheim (DE); Lukas Friedrich Doessel, Darmstadt (DE); Dominic Stoerkle, Darmstadt (DE)

(73) Assignee: EVONIK ROEHM GMBH, Darmstadt (DE)

( * ) Notice: Subject to any disclaimer, the term of this patent is extended or adjusted under 35 U.S.C. 154(b) by 244 days.

(21) Appl. No.: 14/772,618

(22) PCT Filed: Mar. 19, 2014

(86) PCT No.: PCT/EP2014/055489
§ 371 (c)(1),
(2) Date: Sep. 3, 2015

(87) PCT Pub. No.: WO2014/154543
PCT Pub. Date: Oct. 2, 2014

(65) Prior Publication Data
US 2015/0376437 A1 Dec. 31, 2015

(30) Foreign Application Priority Data
Mar. 25, 2013 (EP) ..................... 13160867

(51) Int. Cl.
| | |
|---|---|
| *C08L 83/00* | (2006.01) |
| *C09D 133/08* | (2006.01) |
| *C08F 220/14* | (2006.01) |
| *C08F 220/18* | (2006.01) |
| *C08F 285/00* | (2006.01) |
| *C08L 51/00* | (2006.01) |
| *C09D 125/12* | (2006.01) |
| *C09D 125/14* | (2006.01) |

(52) U.S. Cl.
CPC .......... *C09D 133/08* (2013.01); *C08F 220/14* (2013.01); *C08F 220/18* (2013.01); *C08F 285/00* (2013.01); *C08L 51/003* (2013.01); *C09D 125/12* (2013.01); *C09D 125/14* (2013.01); *C08L 2207/53* (2013.01)

(58) Field of Classification Search
CPC ... C09D 133/08; C09D 125/14; C09D 125/12
See application file for complete search history.

(56) References Cited

U.S. PATENT DOCUMENTS

| | | | |
|---|---|---|---|
| 3,793,402 A | 2/1974 | Owens | |
| 6,172,135 B1 | 1/2001 | Fraser et al. | |
| 6,319,966 B1 | 11/2001 | Kang et al. | |
| 7,605,193 B2* | 10/2009 | Schultes | C08F 265/04 523/201 |
| 7,683,131 B2* | 3/2010 | Goldacker | C08F 265/04 525/211 |
| 7,695,813 B2* | 4/2010 | Schultes | C08F 265/04 428/407 |
| 8,119,734 B2* | 2/2012 | Schultes | C08F 285/00 524/800 |
| 2003/0125465 A1 | 7/2003 | Koyama et al. | |
| 2006/0052515 A1 | 3/2006 | Schultes et al. | |
| 2011/0136980 A1 | 6/2011 | Pirra et al. | |
| 2011/0218291 A1 | 9/2011 | Schultes et al. | |
| 2014/0017335 A1 | 1/2014 | Dimov et al. | |

FOREIGN PATENT DOCUMENTS

| | | |
|---|---|---|
| DE | 102 60 089 A1 | 7/2004 |
| EP | 1 350 812 A2 | 10/2003 |
| JP | 2003-231760 A | 8/2003 |
| JP | 2004-352837 A | 12/2004 |
| JP | 2008-239739 A | 10/2008 |
| JP | 2012-136644 A | 7/2012 |
| KR | 10-0274658 B1 | 12/2000 |
| KR | 10-2005-0085769 A | 8/2005 |
| TW | 201247763 A1 | 12/2012 |
| WO | WO 2012/130595 A1 | 10/2012 |

OTHER PUBLICATIONS

International Search Report dated May 19, 2014, in PCT/EP2014/055489 filed Mar. 19, 2014.
European Search Report dated Aug. 19, 2013, in European Patent Application No. 13160867.1 filed Mar. 25, 2013.
Combined Taiwanese Office Action and Search Report dated Oct. 3, 2016 in Patent Application No. 103110490 (with English language translation).
Notice of Opposition issued Dec. 14, 2017 in European Patent Application No. 14711249.4.
David I. Johnson, et al., "Refractive Index and Thermo-optic Coefficient of Composite Polymers at 1.55 μm", Proc. of SPIE, vol. 6038, 603821, 2006, 9 pages.

\* cited by examiner

*Primary Examiner* — Hannah Pak
(74) *Attorney, Agent, or Firm* — Oblon, McClelland, Maier & Neustadt, L.L.P.

(57) ABSTRACT

The invention relates to a molding composition modified for impact resistance, in particular to impact-resistant PMMA with improved optical properties at elevated temperatures, to molded items obtainable therefrom, and also to the use of the molding composition and of the molded items.

17 Claims, 1 Drawing Sheet

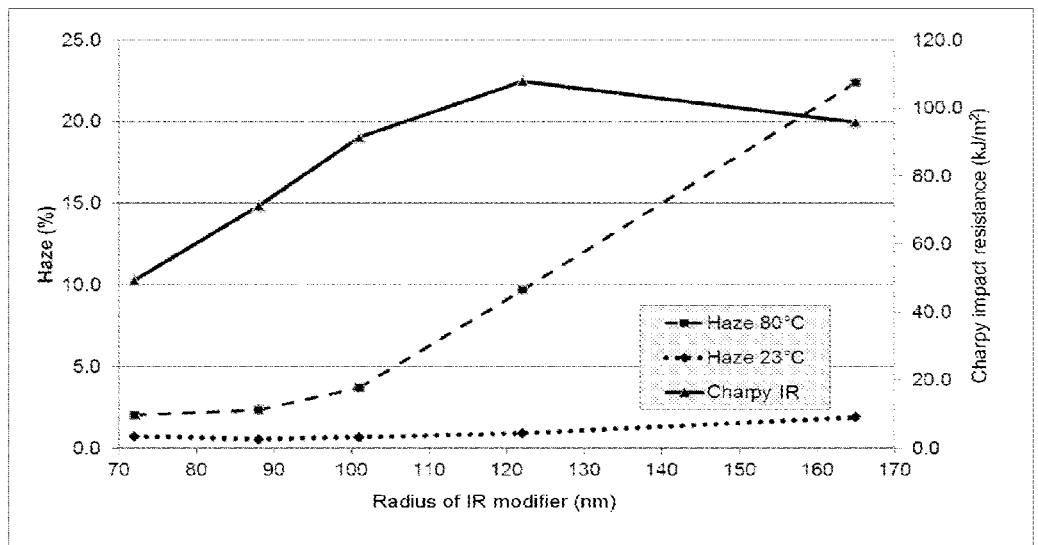

PMMA PROVIDED WITH IMPACT RESISTANCE AND HAVING IMPROVED OPTICAL PROPERTIES

The invention relates to a moulding composition modified for impact resistance, in particular to impact-resistant PMMA with improved optical properties at elevated temperatures, to moulded items obtainable therefrom, and also to the use of the moulding composition and of the moulded items.

It has long been known that the impact resistance of moulding compositions, in particular of poly(meth)acrylate moulding compositions, can be improved by adding, to the moulding composition, a suitable amount of what are known as impact modifiers. A method which has become established in industry for this purpose is the use of impact modifiers produced by emulsion polymerization, known as core-shell particles and/or core-shell-shell particles. These generally have an elastomeric phase, and in the case of a core-shell structure it is mostly the core that represents the elastomeric phase and in the case of a core-shell-shell structure it is mostly the first shell, grafted onto the core, that represents the elastomeric phase.

By way of example, the U.S. Pat. No. 3,793,402 discloses impact-resistant moulding compositions, in particular based on poly(meth)acrylate, which comprise from 90 to 4% by weight of a multistage core-shell-shell particle with a hard core, with an elastomeric first shell and with a hard second shell. Typical main constituents of the core and of the second shell are alkyl methacrylates having from 1 to 4 carbon atoms in the alkyl moiety, in particular methyl methacrylate. The first shell is in essence made of butadiene, of substituted butadienes and/or of alkyl acrylates having from 1 to 8 carbon atoms in the alkyl moiety. However, it can also comprise from 0 to 49.9% by weight, in particular from 0.5 to 30% by weight, of copolymerizable monomer units, for example copolymerizable, monoethylenically unsaturated monomer units. In accordance with U.S. Pat. No. 3,793,402, the presence of from 10 to 25% by weight of copolymerizable, monoethylenically unsaturated monomer units, in particular of styrene, is very particularly advantageous here.

The core-shell-shell particles are produced by multistage emulsion polymerization, with use of thermal initiators such as persulphates or redox initiator systems. The intention here is that the polymerization takes place at a temperature in the range from 0 to 125° C., in particular in the range from 30 to 95° C.

Similarly, the German Patent Application DE 41 21 652 A1 describes impact modifiers for thermoplastics such as polymethyl methacrylate, composed of an at least three-phase emulsion polymer comprising A) a hard core made of a crosslinked homo- or copolymer of ethylenically unsaturated monomers amenable to free-radical polymerization;

B) produced in the presence of the core material, an elastomer phase with a glass transition temperature not above 10° C., which is composed of a) an alkyl ester of acrylic acid having from 1 to 8 carbon atoms in the alkyl moiety;

b) at least one crosslinking comonomer having two or more polymerizable double bonds in the molecule;

c) arylalkyl acrylate or arylalkyl methacrylate;

d) produced in the presence of the elastomer phase, a hard phase made of a homo- or copolymer of ethylenically unsaturated monomers amenable to free-radical polymerization with a glass transition temperature of at least 50° C.

A moulding composition (Example 3) mentioned by way of example in this document has an Izod notched impact resistance of 6.2 kJ/m$^2$ at room temperature, of 4.7 kJ/m$^2$ at −10° C. and of 3.7 kJ/m$^2$ at −20° C. The Vicat softening point of this moulding composition is 97° C.

The core-shell-shell particles are likewise produced by means of multistage emulsion polymerization, with use of alkali metal peroxodisulphate or ammonium peroxodisulphate as initiator and carrying out the polymerization at a temperature in the range from 20 to 100° C., for example 50° C.

The German Patent Application DE 41 36 993 A1 discloses impact-modified moulding compositions which comprise from 10 to 96% by weight of a polymer based on polymethyl methacrylate and from 4 to 90% by weight of a multistage core-shell-shell particle, where the production of the core and of the second shell respectively uses a monomer mixture which consists essentially of methyl methacrylate. The monomer mixture for the first shell comprises from 60 to 89.99% by weight of alkyl acrylate having from 1 to 20 carbon atoms in the alkyl moiety and/or cycloalkyl acrylates having from 5 to 8 carbon atoms in the cycloalkyl moiety and from 10 to 39.99% by weight of phenylalkyl acrylate having from 1 to 4 carbon atoms in the alkyl moiety, and also optionally other constituents. The average particle diameter of the core-shell-shell particles is in the range from 50 to 1000 nm, in particular in the range from 150 to 400 nm.

In accordance with said document, the core-shell-shell particles are obtained by a multistage seed-latex process which uses ammonium peroxodisulphate or alkali metal peroxodisulphate, such as potassium peroxodisulphate, or initiator combination systems, as polymerization initiators, where the intended polymerization temperature in the case of the ammonium peroxodisulphate and alkali metal peroxodisulphate, these requiring thermal activation, is from 50 to 100° C.

The European Patent EP 0 828 772 B1 describes the impact-modification of poly(meth)acrylates by means of multistage core-shell particles or core-shell-shell particles which are composed of a core, of a first shell and optionally of a second shell and are free from vinylically unsaturated compounds having at least two identically reactive double bonds. The core here comprises a first (meth)acrylic polymer. The first shell comprises a polymer with low glass transition temperature which comprises from 0 to 25% by weight, in particular from 5 to 26% by weight, of a styrenic monomer and from 75 to 100% by weight of a (meth)acrylic monomer which forms a homopolymer with a glass transition temperature of from −75 to −5° C. The optionally present second shell comprises a second (meth)acrylic polymer which can be the same as the first (meth)acrylic polymer or can differ therefrom. The total diameter of the core-shell particles or core-shell-shell particles is in the range from 250 to 320 nm.

The core-shell particles or core-shell-shell particles are in turn produced by multistage emulsion polymerization at 80° C., with use of a potassium persulphate as initiator.

The international Patent Application WO 2004/056893 describes efficient processes for the production of core-shell particles or core-shell-shell particles. Core-shell particles or core-shell-shell particles with a total radius of from 150.0 to 250.0 nm are described as particularly suitable for the impact-modification of polyalkyl (meth)acrylate moulding compositions. Minimal amounts of said impact modifiers can give a sufficient improvement in the notched impact resistance of a moulding composition in particular at room temperature, without any simultaneous noticeable impairment of the other significant properties of the moulding composition, in particular modulus of elasticity, melt viscosity, Vicat point and die swell. The resultant moulding compositions have a Charpy notched impact resistance (ISO 179) at 23° C. which is preferably at least 6.0 kJ/m$^2$ and a haze at 23° C. in accordance with ASTM D1003 (1997) that is preferably at most 2.5%. However, at 80° C. the moulding compositions have markedly poorer haze values, i.e. have visible haze.

However, a fundamental requirement placed upon moulding compositions for products in particular for applications such as lighting and (automobile) glazing is optical clarity even at elevated temperature. Products that are considered to be optically clear here are those with a haze value smaller than or equal to 15.0%, in particular below 10.0% and very particularly below 6.0%, measured by means of a BYK Gardner Hazegard-plus hazemeter in accordance with ASTM D1003 (1997).

It is therefore desirable that the moulding compositions used for the production of lighting and (automobile) glazing exhibit markedly reduced haze increase at elevated temperature. There must therefore be compliance with the requirements placed upon toughness in combination with optical properties such as high transparency with very low haze value even at elevated temperatures. In particular when the products are used in lighting applications with signal colours there should be no shift of colour coordinates due to any increase in haze; this has hitherto limited the use of impact-modified moulding compositions.

It was therefore an object of the invention to provide a moulding composition which has high impact resistance and improved haze performance.

Surprisingly, it has been found that the moulding composition, the moulded items, and also the uses, described herein achieve this object.

The patent provides a moulding composition which comprises, based in each case on its total weight, the following:

I. from 10.0 to 50.0% by weight, preferably from 15.0 to 45.0% by weight, more preferably from 20.0 to 40.0% by weight, of at least one core-shell-shell particle, II. from 1.0 to 90.0% by weight, preferably from 1.0 to 85.0% by weight, more preferably from 1.0 to 80.0% by weight, of at least one (meth)acrylic polymer, III. from 0.0 to 45.0% by weight, preferably from 0.0 to 30% by weight, preferably from 0.0 to 10% by weight, of styrene-acrylonitrile copolymers, and IV. from 0.0 to 10.0% by weight of other additives, where the percentages by weight of components I. to IV. give a total of 100.0% by weight and where selection of II., or of the mixture of II., III. and/or IV. is such that in a measurement in accordance with ASTM D542 its refractive index differs from the refractive index of I. by no more than 0.01 unit, preferably by no more than 0.002 unit, with preference by no more than 0.001 unit.

The core-shell-shell particle, I., has been produced or is amenable to production by a process in which a) water and emulsifier are used as initial charge, b) from 20.0 to 45.0 parts by weight of a first composition, comprising components A), B), C) and D), are added and the mixture is polymerized until conversion is at least 85.0% by weight, based on the total weight of components A), B), C) and D), c) from 35.0 to 55.0 parts by weight of a second composition, comprising components E), F) and G), are added and the mixture is polymerized until conversion is at least 85.0% by weight, based on the total weight of components E), F) and G), d) from 10.0 to 30.0 parts by weight of a third composition, comprising components H), I) and J), are added and the mixture is polymerized until conversion is at least 85.0% by weight, based on the total weight of components H), I) and J), where the stated parts by weight of the compositions b), c) and d) give a total of 100.0 parts by weight.

The progress of the polymerization reaction in each step can be followed in a known manner, for example gravimetrically or by means of gas chromatography.

The process for obtaining I. preferably uses, as initial charge, from 90.00 to 99.99 parts by weight of water and from 0.01 to 10.00 parts by weight of emulsifier, where the stated parts by weight give a total of 100.00 parts by weight.

The polymerizations b), c) and/or d) in the process for obtaining I. can be carried out at a temperature in the range from above 60 to below 90° C. or can be initiated by a redox initiator system.

In one preferred embodiment, each polymerization in the process for obtaining I. is carried out at a temperature in the range from above 60 to below 90° C. or each polymerization is initiated by a redox initiator system. It is preferable that each polymerization in the process for obtaining I. is carried out at a temperature in the range from above 60 to below 90° C.

In another embodiment, the polymerization in the steps b) to d) in the process for obtaining I. takes place at a temperature in the range from above 70 to below 85° C., preferably in the range from above 75 to below 85° C.

The initiation can be achieved by using the initiators commonly used for emulsion polymerization. Examples of suitable organic initiators are hydroperoxides, such as tert-butyl hydroperoxide or cumene hydroperoxide. Suitable inorganic initiators are hydrogen peroxide, and also the alkali metal, and the ammonium, salts of peroxodisulphuric acid, in particular sodium peroxodisulphate and potassium peroxodisulphate. The initiators mentioned can be used either individually or else in a mixture. They are preferably used in an amount of from 0.05 to 3.0% by weight, based on the total weight of the monomers of the respective stage.

In another preferred embodiment, the polymerization in the steps b) to d) is initiated with the use of a peroxodisulphate, preferably with use of ammonium peroxodisulphate and/or alkali metal peroxodisulphate.

By way of example, from 0.01 to 0.5% by weight of alkali metal peroxodisulphate or of ammonium peroxodisulphate, based on the aqueous phase, can be used as polymerization initiator, the polymerization here being initiated at temperatures of from 20 to 100° C. It is preferable to operate with redox systems, for example made of from 0.01 to 0.05% by weight of organic hydroperoxides and from 0.05 to 0.15% by weight of Rongalit® at temperatures of from 20 to 80° C. Polymerization of the hard phase generally uses a suitable amount of a chain-transfer agent, e.g. of a mercaptan, concomitantly in order to bring the molecular weight of the hard-phase polymer close to that of the moulding composition which is to be modified with the three-phase emulsion polymer.

Emulsifiers and/or protective colloids can be used to stabilize the mixture. Preference is given to stabilization by emulsifiers, in order to obtain a low dispersion viscosity. The total amount of emulsifier is preferably from 0.1 to 5% by weight, in particular from 0.5 to 3% by weight, based on the total weight of the monomers A) to J). Particularly suitable emulsifiers are anionic and/or non-ionic emulsifiers and mixtures of these, in particular:

alkyl sulphates, preferably those having from 8 to 18 carbon atoms in the alkyl moiety, alkyl and alkylaryl ether sulphates having from 8 to 18 carbon atoms in the alkyl moiety and from 1 to 50 ethylene oxide units;

sulphonates, preferably alkylsulphonates having from 8 to 18 carbon atoms in the alkyl moiety, alkylarylsulphonates having from 8 to 18 carbon atoms in the alkyl moiety, esters and half-esters of sulphosuccinic acid with monohydric alcohols or alkylphenols having from 4 to 15 carbon atoms in the alkyl moiety; these alcohols or alkylphenols may also optionally have been ethoxylated with from 1 to 40 ethylene oxide units;

partial esters of phosphoric acid and the alkali metal and ammonium salts of these, preferably alkyl and alkylaryl phosphates having from 8 to 20 carbon atoms in the alkyl and, respectively, alkylaryl moiety and from 1 to 5 ethylene oxide units;

alkyl polyglycol ethers, preferably having from 8 to 20 carbon atoms in the alkyl moiety and from 8 to 40 ethylene oxide units;

alkylaryl polyglycol ethers, preferably having from 8 to 20 carbon atoms in the alkyl and, respectively, alkylaryl moiety and from 8 to 40 ethylene oxide units;

ethylene oxide-propylene oxide copolymers, preferably block copolymers, advantageously having from 8 to 40 ethylene oxide and, respectively, propylene oxide units.

The process for obtaining I. can use anionic and/or non-ionic emulsifiers.

In one embodiment, the emulsion polymerization is carried out in the presence of anionic emulsifiers selected from the group consisting of paraffinsulphonates, alkyl sulphosuccinates and alkoxylated and sulphated paraffins.

It is preferable to use mixtures of anionic emulsifier and to use non-ionic emulsifier. Mixtures which have proved very particularly successful here are those of an ester or hemiester of sulphosuccinic acid with monohydric alcohols or alkylphenols having from 4 to 15 carbon atoms in the alkyl moiety as anionic emulsifier and of an alkyl polyglycol ether, preferably having from 8 to 20 carbon atoms in the alkyl moiety and from 8 to 40 ethylene oxide units, as non-ionic emulsifier in a ratio by weight of from 8:1 to 1:8.

The emulsifiers can optionally also be used in a mixture with protective colloids. Suitable protective colloids comprise inter alia partially hydrolyzed polyvinyl acetates, polyvinylpyrrolidones, carboxymethyl-, methyl-, hydroxyethyl- or hydroxypropylcellulose, starches, proteins, poly(meth)acrylic acid, poly(meth)acrylamide, polyvinylsulphonic acids, melamine-forrnaldehydesulphonates, naphthalene-formaldehydesulphonates, styrene-maleic acid copolymers and vinyl ether-maleic acid copolymers. If protective colloids are used, the amount used thereof is preferably from 0.01 to 1.0% by weight, based on the total amount of the monomers A) to J). The protective colloids can be used as initial charge prior to the start of the polymerization, or can be metered into the system.

In one preferred embodiment, the process for obtaining I. uses, as initial charge, an aqueous emulsion which comprises an alkyl alcohol having from 12 to 20 carbon atoms in the alkyl moiety.

The initiator can be used as initial charge or can be metered into the system. It is moreover also possible to use some of the initiator as initial charge and to meter the remainder into the system.

The polymerization is preferably initiated by heating the mixture to the polymerization temperature and metering the initiator into the system, preferably in aqueous solution. Emulsifier and monomers can be metered separately or in the form of mixture. When mixtures of emulsifier and monomer are metered into the system, the procedure is that emulsifier and monomer are premixed in a mixer upstream of the polymerization reactor. It is preferable that the remainder of emulsifier and the remainder of monomer which were not used as initial charge are metered separately from one another into the system after the start of the polymerization. It is preferable that the time at which the metering begins is from 15 to 35 minutes after the start of the polymerization.

It is moreover particularly advantageous for the purposes of the present invention that the initial charge comprises what is known as a "seed latex", which is preferably obtainable by polymerization of alkyl (meth)acrylates.

It is preferable to use, as initial charge, an aqueous emulsion a) which comprises a seed latex. In one preferred embodiment, a seed latex used as initial charge has a particle diameter, measured by the Coulter method in the range from 10.0 to 40.0 nm.

These small radii can be calculated after a defined polymerization process applied to the seed latex, which constructs a shell around the seed latex, where the radii of the resultant particles have been measured by the Coulter method. This particle-size-determination method known from the literature is based on the measurement of the electrical resistance, which changes in a characteristic manner on passage of particles through a narrow measurement aperture. Further details can by way of example be found in Nachr. Chem. Tech. Lab. 43, 553-566 (1995).

The monomer constituents of the actual core, i.e. the first composition, are added to the seed latex, preferably under conditions such that formation of new particles is avoided. The polymer produced in the first process stage is thus deposited in the form of a shell around the seed latex. By analogy, the monomer constituents of the first shell material (second composition) are added to the emulsion polymer under conditions such that formation of new particles is avoided. The polymer produced in the second stage is thus deposited in the form of a shell around the existing core. This procedure is to be repeated correspondingly for each further shell.

In accordance with another preferred embodiment of the present invention, the core-shell-shell particles of the invention are obtained by an emulsion polymerization process which uses, as initial charge, instead of the seed latex, an emulsified long-chain, aliphatic alcohol, preferably having from 12 to 20 carbon atoms. One preferred embodiment of this process uses stearyl alcohol as long-chain, aliphatic alcohol. The core-shell-shell structure is obtained by analogy with the procedure described above by stepwise addition and polymerization of the corresponding monomers while avoiding formation of new particles. Further details relating to the polymerization process can be found by the person skilled in the art in the Patents DE 3343766, DE 3210891, DE 2850105, DE 2742178 and DE 3701579.

However, irrespective of the specific procedure, it has proved to be particularly advantageous in the process for obtaining I. for the purposes of the present invention to meter the second composition (in accordance with c)) and the third composition (in accordance with d)) into the system as required by consumption.

The chain lengths, in particular of the (co)polymers of the second shell (third composition), can be adjusted by polymerization of the monomer or of the monomer mixture in the presence of chain-transfer agent(s), for example in particular the mercaptans known for this purpose, e.g. n-butyl mercaptan, n-dodecyl mercaptan, 2-mercaptoethanol or 2-ethylhexyl thioglycolate or pentaerythritol tetrathioglycolate, the amounts used of the chain-transfer agent(s) here generally being from 0.05 to 5% by weight, based on the monomer mixture, preferably from 0.1 to 2% by weight and particularly preferably from 0.2 to 1% by weight, based on the monomer mixture (cf. by way of example H. Rauch-Puntigam, Th. Völker, "Acryl- und Methacrylverbindungen" [Acrylic and methacrylic compounds], Springer, Heidelberg, 1967; Houben-Weyl, Methoden der organischen Chemie [Methods of organic chemistry], Vol. XIV/1, p. 66, Georg Thieme, Heidelberg, 1961 or Kirk-Othmer, Encyclopedia of Chemical Technology, Vol. 1, p. 29611, J. Wiley, New York, 1978). It is preferable to use n-dodecyl mercaptan as chain-transfer agent.

In accordance with the invention, selection of the relative proportions of all of the substances A) to J) in the process for obtaining I. is such as to give core-shell-shell particles with a total radius, measured by the Coulter method, in the range from 70.0 to 125.0 nm, preferably in the range from 85 to 110.0 nm, with preference in the range from 90.0 to 105.0 nm.

For the purposes of the present invention it is particularly advantageous in the process for obtaining I. to select the relative proportions of all of the substances A) to J) in such a way that the total weight of the substances A) to J), based on the total weight of the aqueous dispersion, is at least 30% by weight and preferably from 40 to 50% by weight.

In this connection, the term "coagulate" means water-insoluble constituents which can preferably be removed by filtration of the dispersion, advantageously by way of a filter sleeve using filter fabric No. 0.90 in accordance with DIN 4188. The core-shell-shell particle of the invention can be obtained from the dispersion by way of example by spray drying, freeze coagulation, precipitation by electrolyte addition or by the type of mechanical load or thermal stress that can be exerted in accordance with DE 27 50 682 A1 or U.S. Pat. No. 4,110,843 by means of a vented extruder. The spray-drying process is the most commonly used, although the other processes mentioned have the advantage that they remove the water-soluble polymerization auxiliaries at least to some extent from the polymer.

The first composition in accordance with b) for the core-shell-shell particles, I., comprises A) from 50.0 to 99.9 parts by weight, preferably from 71.0 to 99.9 parts by weight, of alkyl methacrylates having from 1 to 20, preferably from 1 to 12, in particular from 1 to 8, carbon atoms in the alkyl moiety, B) from 0.0 to 40.0 parts by weight, preferably from 0.0 to 29.0 parts by weight, of alkyl acrylates having from 1 to 20, preferably from 1 to 12, in particular from 1 to 8, carbon atoms in the alkyl moiety, C) from 0.1 to 10.0 parts by weight of crosslinking monomers and D) from 0.0 to 8.0 parts by weight of styrenic monomers of the general formula (I)

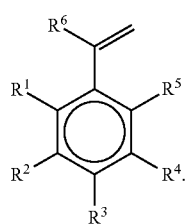

(I)

The moieties $R^1$ to $R^5$ respectively mutually independently denote hydrogen, a halogen, in particular fluorine, chlorine or bromine, a $C_{1-6}$-alkyl group or a $C_{2-6}$-alkenyl group, preferably hydrogen. The moiety $R^6$ designates hydrogen or an alkyl group having from 1 to 6 carbon atoms, preferably hydrogen. Particularly suitable alkyl groups having from 1 to 6 carbon atoms are methyl, ethyl, n-propyl, isopropyl, n-butyl, sec-butyl, tert-butyl, n-pentyl, and n-hexyl groups, and also cyclopentyl and cyclohexyl groups.

Styrenic monomers of the general formula (I) therefore comprise styrene, substituted styrenes having an alkyl substituent in the side chain, for example α-methylstyrene and α-ethylstyrene, substituted styrenes having an alkyl substituent on the ring, for example vinyltoluene and p-methylstyrene, and halogenated styrenes, for example monochlorostyrenes, dichlorostyrenes, tribromostyrenes and tetrabromostyrenes.

In one embodiment, the first composition comprises

A) from 75.0 to 99.9 parts by weight, in particular from 85.0 to 99.5% parts by weight, of alkyl methacrylates having from 1 to 20, preferably from 1 to 12, in particular from 1 to 8, carbon atoms in the alkyl moiety, B) from 0.0 to 24.9 parts by weight, in particular from 0.1 to 14.9 parts by weight, of alkyl acrylates having from 1 to 20, preferably from 1 to 12, in particular from 1 to 8, carbon atoms in the alkyl moiety, C) from 0.1 to 5.0 parts by weight, in particular from 0.1 to 2.0 parts by weight, of crosslinking monomers and D) from 0.0 to 8.0 parts by weight of styrenic monomers of the general formula (I), where the stated parts by weight give a total of 100.0 parts by weight.

According to the invention, the compounds A), B), C) and D) differ from one another, and in particular the compounds A) and B) comprise no crosslinking monomers C).

The abovementioned alkyl methacrylates (A) are esters of methacrylic acid, for example methyl methacrylate, ethyl methacrylate, propyl methacrylate, isopropyl methacrylate, n-butyl methacrylate, sec-butyl methacrylate, tert-butyl methacrylate, pentyl methacrylate, hexyl methacrylate, heptyl methacrylate, octyl methacrylate, 2-octyl methacrylate, ethylhexyl methacrylate, nonyl methacrylate, 2-methyloctyl methacrylate, 2-tert-butylheptyl methacrylate, 3-isopropylheptyl methacrylate, decyl methacrylate, undecyl methacrylate, 5-methylundecyl methacrylate, dodecyl methacrylate, 2-methyldodecyl methacrylate, tridecyl methacrylate, 5-methyltridecyl methacrylate, tetradecyl methacrylate, pentadecyl methacrylate, hexadecyl methacrylate, 2-methylhexadecyl methacrylate, heptadecyl methacrylate, 5-isopropylheptadecyl methacrylate, 5-ethyloctadecyl methacrylate, octadecyl methacrylate, nonadecyl methacrylate, eicosyl methacrylate, cycloalkyl methacrylates, for example cyclopentyl methacrylate, cyclohexyl methacrylate, 3-vinyl-2-butylcyclohexyl methacrylate, cycloheptyl methacrylate, cyclooctyl methacrylate, bornyl methacrylate and isobornyl methacrylate.

In one particularly preferred embodiment of the present invention, the first composition comprises, based on the total weight of components A) to D), at least 50% by weight, advantageously at least 60% by weight, preferably at least 75% by weight, in particular at least 85% by weight, of methyl methacrylate.

The abovementioned alkyl acrylates (B) are esters of acrylic acid, for example methyl acrylate, ethyl acrylate, propyl acrylate, isopropyl acrylate, n-butyl acrylate, sec-butyl acrylate, tert-butyl acrylate, pentyl acrylate, hexyl acrylate, heptyl acrylate, octyl acrylate, 2-octyl acrylate, ethylhexyl acrylate, nonyl acrylate, 2-methyloctyl acrylate, 2-tert-butylheptyl acrylate, 3-isopropylheptyl acrylate, decyl acrylate, undecyl acrylate, 5-methylundecyl acrylate, dodecyl acrylate, 2-methyldodecyl acrylate, tridecyl acrylate, 5-methyltridecyl acrylate, tetradecyl acrylate, pentadecyl acrylate, hexadecyl acrylate, 2-ethylhexadecyl acrylate, heptadecyl acrylate, 5-isopropylheptadecyl acrylate, 5-ethyloctadecyl acrylate, octadecyl acrylate, nonadecyl acrylate, eicosyl acrylate, cycloalkyl acrylates, for example cyclopentyl acrylate, cyclohexyl acrylate, 3-vinyl-2-butylcyclohexyl acrylate, cycloheptyl acrylate, cyclooctyl acrylate, bornyl acrylate and isobornyl acrylate.

Crosslinking monomers (C) comprise all of the compounds which are capable, under the present polymerization conditions, of bringing about crosslinking. These include in particular (a) Difunctional (meth)acrylates, preferably compounds of the general formula:

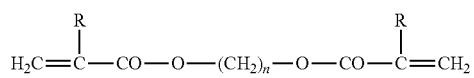

where R is hydrogen or methyl and n is a positive whole number greater than or equal to 2, preferably from 3 to 20, in particular di(meth)acrylates of propanediol, of butanediol, of hexanediol, of octanediol, of nonanediol, of decanediol, and of eicosanediol;

Compounds of the general formula:

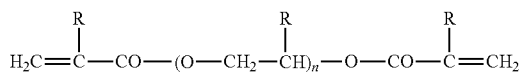

where R is hydrogen or methyl and n is a positive whole number from 1 to 14, in particular di(meth)acrylate of ethylene glycol, of diethylene glycol, of triethylene glycol, of tetraethylene glycol, of dodecaethylene glycol, of tetradecaethylene glycol, of propylene glycol, of dipropyl glycol and of tetradecapropylene glycol;

Glycerol di(meth)acrylate, 2,2'-bis[p-(γ-methacryloxy-β-hydroxypropoxy)phenylpropane] or bis-GMA, bisphenol A dimethacrylate, neopentyl glycol di(meth)acrylate, 2,2'-di(4-methacryloxypolyethoxyphenyl)propane having from 2 to 10 ethoxy groups per molecule and 1,2-bis(3-methacryloxy-2-hydroxypropoxy)butane; and (b) tri- or polyfunctional (meth)acrylates, in particular trimethylolpropane tri(meth)acrylates and pentaerythritol tetra(meth)acrylate.

(c) Graft crosslinking agents having at least two C—C double bonds of differing reactivity, in particular allyl methacrylate and allyl acrylate;

(d) aromatic crosslinking agents, in particular 1,2-divinylbenzene, 1,3-divinylbenzene and 1,4-divinylbenzene.

The manner of monomer selection or, respectively, of selection of the proportions by weight of the monomers A) to D) of the first composition is preferably such that the polymer obtainable by polymerization of the first composition has a glass transition temperature Tg of at least 10° C., preferably of at least 30° C. The glass transition temperature Tg of the polymer here can be determined in a known manner by differential scanning calorimetry (DSC). The glass transition temperature Tg may also be precalculated as an approximation by means of the Fox equation. According to Fox T. G., Bull. Am. Physics Soc. 1, 3, p. 123 (1956):

$$\frac{1}{Tg} = \frac{x_1}{Tg_1} + \frac{x_2}{Tg_2} + \ldots + \frac{x_n}{Tg_n}$$

where $x_n$ is the proportion by weight (% by weight/100) of the monomer n and $Tg_n$ is the glass transition temperature in Kelvin of the homopolymer of the monomer n. The person skilled in the art may obtain further useful information from Polymer Handbook $2^{nd}$ Edition, J. Wiley & Sons, New York (1975), which gives Tg values for the homopolymers most commonly encountered.

The second composition in accordance with c) for the core-shell-shell particles, I., comprises E) from 80.0 to 100.0 parts by weight of (meth)acrylates,
F) from 0.05 to 5.0 parts by weight of crosslinking monomers and
G) from 0.0 to 25.0 parts by weight of styrenic monomers of the general formula (I).

According to the invention, the compounds E), F) and G) differ from one another, and in particular the compounds E) comprise no crosslinking monomers F).

In one particular embodiment, the second composition comprises

E) from 92.0 to 98.0 parts by weight of (meth)acrylates,
F) from 0.1 to 2.0 parts by weight of crosslinking monomers and
G) from 8.0 to 20.0 parts by weight of styrenic monomers of the general formula (I), where the stated parts by weight preferably give a total of 100.0 parts by weight.

For the purposes of the present invention, (meth)acrylates are acrylates, methacrylates, and also mixtures of the two. They therefore comprise compounds which have at least one group of the following formula

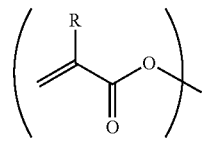

where R indicates hydrogen or a methyl moiety. Among these are in particular the abovementioned alkyl acrylates and alkyl methacrylates. Other compounds that have also proved particularly useful for the purposes of the present invention are arylalkyl acrylates, especially benzyl, phenylethyl, phenylpropyl, phenylpentyl and/or phenylhexyl acrylate. The amount used of these is preferably in the range from 0.1 to 40.0% by weight, based on the total weight of components E) and F).

According to the invention, the crosslinking monomers F) comprise the abovementioned crosslinking monomers C).

It is preferable that E) comprises alkyl acrylates having from 3 to 8 carbon atoms in the alkyl moiety and/or alkyl methacrylates having from 7 to 14 carbon atoms in the alkyl moiety.

For the purposes of one very particularly preferred embodiment of the present invention, the second composition comprises E) from 90.0 to 97.9 parts by weight of alkyl acrylates having from 3 to 8 carbon atoms in the alkyl moiety and/or alkyl methacrylates having from 7 to 14 carbon atoms in the alkyl moiety, in particular butyl acrylate and/or dodecyl methacrylate, F) from 0.1 to 2.0 parts by weight of crosslinking monomers and G) from 0.0 to 20.0 parts by weight, preferably from 8.0 to 20.0 parts by weight, of styrenic monomers of the general formula (I), where the parts by weight preferably give a total of 100.0 parts by weight.

The selection of the monomers and, respectively, the selection of the proportions by weight of the monomers E), F) and G) of the second composition is advantageously such that the polymer obtainable by polymerization of the second composition has a glass transition temperature Tg below 30° C., preferably below 10° C., in particular in the range from 0 to −75° C. The glass transition temperature Tg of the polymer here can, as mentioned above, be determined by differential scanning calorimetry (DSC) and/or approximated in advance by means of the Fox equation.

The third composition in accordance with d) for the core-shell-shell particles, I., comprises H) from 50.0 to 100.0 parts by weight of alkyl methacrylates having from 1 to 20, preferably from 1 to 12, in particular from 1 to 8, carbon atoms in the alkyl moiety, I) from 0.0 to 40.0 parts by weight of alkyl acrylates having from 1 to 20, preferably from 1 to 12, in particular from 1 to 8, carbon atoms in the alkyl moiety and J) from 0.0 to 10.0 parts by weight of styrenic monomers of the general formula (I).

In one preferred embodiment, the third composition comprises

H) from 60.0 to 100.0 parts by weight, preferably from 75.0 to 100.0 parts by weight, in particular from 85.0 to 99.5 parts by weight, of alkyl methacrylates having from 1 to 20, preferably from 1 to 12, in particular from 1 to 8, carbon atoms in the alkyl moiety, I) from 0.0 to 25.0 parts by weight, in particular from 0.1 to 15.0 parts by weight, of alkyl acrylates having from 1 to 20, preferably from 1 to 12, in particular from 1 to 8, carbon atoms in the alkyl moiety, J) from 0.0 to 10.0 parts by weight, preferably from 0.0 to 8.0 parts by weight, of styrenic monomers of the general formula (I), where the stated parts by weight preferably give a total of 100.0 parts by weight.

In accordance with one particularly preferred embodiment of the present invention, the third composition comprises, based on the total weight of components H) to J), at least 50% by weight, advantageously at least 60% by weight, preferably at least 75% by weight, in particular at least 85% by weight, of methyl methacrylate.

The selection of the monomers and, respectively, the selection of the proportions by weight of the monomers H), I) and J) of the third composition is advantageously such that the polymer obtainable by polymerization of the third composition has a glass transition temperature Tg at least 10° C., preferably at least 30° C. The glass transition temperature Tg of the polymer here can, as mentioned above, be determined by differential scanning calorimetry (DSC) and/or approximated in advance by means of the Fox equation.

The core-shell-shell particle I. serves to improve the notched impact resistance of hard thermoplastics which are compatible with the hard phase, preferably in the moulding compositions of the invention, for example poly(meth)acrylate moulding compositions, in particular polymethyl methacrylate.

For the purposes of the invention, very particular preference is given to a moulding composition comprising respectively, based on its total weight:

I. from 10.0 to 50.0% by weight, preferably from 15.0 to 45.0% by weight, more preferably from 20.0 to 40% by weight, of at least one core-shell-shell particle produced or amenable to production by a process in which
  a) water and emulsifier are used as initial charge,
  b) from 20.0 to 45.0 parts by weight of a first composition comprising:
    A) from 50.0 to 99.9 parts by weight, preferably from 71.0 to 99.9 parts by weight, of alkyl methacrylates having from 1 to 20 carbon atoms in the alkyl moiety,
    B) from 0.0 to 40.0 parts by weight, preferably from 0.0 to 29.0 parts by weight, of alkyl acrylates having from 1 to 20 carbon atoms in the alkyl moiety,
    C) from 0.1 to 10.0 parts by weight of crosslinking monomers and
    D) from 0.0 to 8.0 parts by weight of styrenic monomers of the general formula (I)

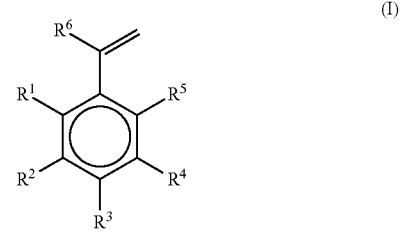

are added, where the moieties $R^1$ to $R^5$ respectively mutually independently denote hydrogen, a halogen, a $C_{1-6}$-alkyl group or a $C_{2-6}$-alkenyl group and the moiety $R^6$ is hydrogen or an alkyl group having from 1 to 6 carbon atoms, based on the total weight of components A), B), C) and D),
  c) from 35.0 to 55.0 parts by weight of a second composition comprising:
    E) from 80.0 to 100.0 parts by weight of (meth)acrylates
    F) from 0.05 to 5.0 parts by weight of crosslin king monomers and
    G) from 0.0 to 25.0 parts by weight of styrenic monomers of the general formula (I)
    are added, and the mixture is polymerized until conversion is at least 85.0% by weight, based on the total weight of components E), F) and G),
  d) from 10.0 to 30.0 parts by weight of a third composition comprising:
    H) from 50.0 to 100.0 parts by weight of alkyl methacrylates having from 1 to 20 carbon atoms in the alkyl moiety,
    I) from 0.0 to 40.0 parts by weight of alkyl acrylates having from 1 to 20 carbon atoms in the alkyl moiety and
    J) from 0.0 to 10.0 parts by weight of styrenic monomers of the general formula (I) are added, and the mixture is polymerized until conversion is at least 85.0% by weight, based on the total weight of components H), I) and J),
  where the stated parts by weight of the compositions b), c) and d) give a total of 100.0 parts by weight,
  where the relative proportions of all of the substances A) to J) have been selected in such a way as to give core-shell-shell particles with a total radius, measured by the Coulter method, in the range from 70.0 to 125.0 nm, preferably in the range from 85.0 to 110.0 nm, with preference in the range from 90.0 to 105.0 nm;

II. from 1.0 to 90.0% by weight, preferably from 1.0 to 85.0% by weight, more preferably from 1.0 to 80.0% by weight, of at least one (meth)acrylic polymer, III. from 0.0 to 45% by weight, preferably from 0.0 to 30% by weight, preferably from 0.0 to 10.0% by weight, of styrene-acrylonitrile copolymers, and IV. from 0.0 to 10.0% by weight of other additives, where the percentages by weight of components I) to IV) give a total of 100.0% by weight and where selection of II., or of the mixture of II., III. and/or IV. is such that in a measurement in accordance with ASTM D542 its refractive index differs from the refractive index of I. by no more than 0.01 unit, preferably by no more than 0.002 unit, with preference by no more than 0.001 unit.

It is preferable that the at least one (meth)acrylic polymer according to II. comprises, in each case based on its total weight, a) from 52.0 to 100.0% by weight of alkyl methacrylate units having from 1 to 20, preferably from 1 to 12, advantageously from 1 to 8, in particular from 1 to 4, carbon atoms in the repeating alkyl moiety, b) from 0.0 to 40.0% by weight of alkyl acrylate units having from 1 to 20, preferably from 1 to 12, advantageously from 1 to 8, in particular up to 4, carbon atoms in the repeating alkyl moiety and c) from 0.0 to 8.0% by weight of repeating styrenic units of the general formula (I), where the percentages by weight give a total of 100.0% by weight.

It is particularly preferable that the at least one (meth)acrylic polymer according to II. comprises, respectively based on its total weight, a) from 60.0 to 100.0% by weight, particularly preferably from 75.0 to 99.9% by weight, in particular from 85.0 to 99.5% of alkyl methacrylate units having from 1 to 20, preferably from 1 to 12, advantageously from 1 to 8, in particular from 1 to 4, carbon atoms in the repeating alkyl moiety, b) from 0.0 to 25.0% by weight, particularly preferably from 0.1 to 15.0% by weight, in particular from 0.5 to 15.0% by weight, of alkyl acrylate units having from 1 to 20, preferably from 1 to 12, advantageously from 1 to 8, in particular up to 4, carbon atoms in the repeating alkyl moiety and c) from 0.0 to 8.0% by weight of repeating styrenic units of the general formula (I), where the percentages by weight give a total of 100.0% by weight.

In accordance with one particularly preferred embodiment of the present invention, the at least one (meth)acrylic polymer according to II. comprises, based on its total weight, at least 50.0% by weight, advantageously at least 60.0% by weight, preferably at least 75.0% by weight, in particular at least 85.0% by weight, of repeating methyl methacrylate units.

The number-average molar mass of the at least one (meth)acrylic polymer according to II. is moreover preferably in the range from 1000 to 100 000 000 g/mol, preferably in the range from 10 000 to 1 000 000 g/mol, in particular in the range from 50 000 to 500 000 g/mol. This molar mass can by way of example be determined by gel permeation chromatography with polystyrene calibration.

It is very particularly preferable that the constituent II. comprises two or more different (meth)acrylic polymers. In particular it is preferable that when at least one other (meth)acrylic polymer is present this (meth)acrylic polymer has low molecular weight. It is particularly preferable that the number-average molar mass of the low-molecular-weight (meth)acrylic polymer is in the range from 1000 to 70000 g/mol, preferably in the range from 5000 to 60000 g/mol. The low-molecular-weight (meth)acrylic polymer can make up a proportion of from 2-20% by weight, preferably from 5-10% by weight, based on the total weight of the (meth)acrylic polymer II. The addition of a proportion of a low-molecular-weight (meth)acrylic polymer improves the processability of the overall resultant moulding composition in injection moulding or in injection-compression moulding. The person skilled in the art is aware of commonly used flow improvers in the form of low-molecular-weight (meth)acrylic polymers.

The at least one (meth)acrylic polymer according to II. can preferably also take the form of at least one copolymer, preferably of at least one high-Tg copolymer. For the purposes of the present invention, the term "high-Tg" means that the Tg (glass transition temperature) of the high-Tg copolymer is higher than that of polymethyl methacrylate, preferably at least 110° C., with preference at least 115° C., with greater preference at least 120° C., and with particular preference indeed at least 125° C., measured by differential scanning calorimetry under nitrogen in accordance with ISO 11357. A "high-Tg" composition can be either a) a "high-Tg" copolymer of methyl methacrylate and of at least one other monomer, where the Tg of the resultant copolymer is higher than that of polymethyl methacrylate, which is about 105° C., or b) a mixture of a (meth)acrylic polymer and of at least one miscible, semi-miscible, or compatible polymer, where the overall Tg in the case of a miscible polymer, or at least one of the Tg values in the case of a semi-miscible polymer, is higher than 110° C. or c) polymethyl methacrylate with a higher degree of syndiotacticity than randomly polymerized PMMA.

Suitable monomers which can provide higher Tg in a copolymer comprise, but are not restricted to, methacrylic acid, acrylic acid, itaconic acid, substituted styrenes, alpha-methylstyrene, maleic anhydride, isobornyl methacrylate, norbornyl methacrylate, t-butyl methacrylate, cyclohexyl methacrylates, substituted cyclohexyl methacrylates, vinylcyclohexane, phenyl methacrylates, acrylamides, N-isopropylacrylamides, methacrylamides, substituted maleimides, glutarimides, and maleimides.

In one preferred embodiment, the moulding composition of the invention comprises up to 45% by weight of styrene-acrylonitrile copolymers according to III., in particular from 1.0 to 45% by weight, based on the total weight of the moulding composition. It is particularly preferable that the styrene-acrylonitrile copolymers according to III. have been obtained and/or are obtainable by polymerization of a mixture composed of from 70 to 92% by weight of styrene
from 8 to 30% by weight of acrylonitrile and
from 0 to 22% by weight of other comonomers, based in each case on the total weight of the mixture.

The moulding compositions of the invention can comprise other additives in accordance with IV., in particular polymers, for suitable modification of properties.

Usual additives in accordance with IV. can be admixed at any processing stage suitable for this purpose. Among the said usual additives are inter alia dyes, pigments, fillers, reinforcing fibres, lubricants, UV stabilizers, etc.

The moulding composition of the invention can comprise, based on the total weight of this moulding composition, as additives in accordance with IV., from 0.1 to 10.0% by weight, preferably from 0.5 to 5.0% by weight, in particular from 1.0 to 4.0% by weight, of another polymer (AP) which has a weight-average molecular weight that is higher by at least 10%, preferably at least 50%, in particular at least 100%, than that of the at least one (meth)acrylic polymer according to II. The molecular weight here can be determined by way of example by means of gel permeation chromatography with polystyrene calibration.

Particularly suitable polymers (AP) according to the invention preferably comprise, based in each case on their total weight, a) from 52.0 to 100.0% by weight, advantageously from 60.0 to 100.0% by weight, particularly preferably from 75.0 to 99.9% by weight, in particular from 85.0 to 99.5% by weight, of repeating alkyl methacrylate units having from 1 to 20, preferably from 1 to 12, advantageously from 1 to 8, in particular from 1 to 4, carbon atoms in the alkyl moiety, b) from 0.0 to 40.0% by weight, advantageously from 0.0 to 32.0% by weight, particularly preferably from 0.1 to 17.0% by weight, in particular from 0.5 to 7.0% by weight, of repeating alkyl acrylate units having from 1 to 20, preferably from 1 to 12, advantageously from 1 to 8, in particular from 1 to 4, carbon atoms in the alkyl moiety and c) from 0.0 to 8.0% by weight of repeating styrenic units of the general formula (I), where the percentages by weight give a total of 100.0% by weight.

In accordance with one particularly preferred embodiment of the present invention, the polymer (AP) comprises, based on its total weight, at least 50.0% by weight, advantageously at least 60.0% by weight, preferably at least 75.0% by weight, in particular at least 85.0% by weight, of repeating methyl methacrylate units.

The weight-average molar mass of the polymer (AP) is moreover preferably in the range from 10 000 to 100 000 000 g/mol, preferably in the range from 50 000 to 5 000 000 g/mol, advantageously in the range from 100 000 to 1 000 000 g/mol, in particular in the range from 250 000 to 600 000 g/mol. The molar mass here can be determined by way of example by gel permeation chromatography with polystyrene calibration.

Other suitable polymers (AP) are polyacrylonitriles, polystyrenes, polyethers, polyesters, polycarbonates and polyvinyl chlorides. The polymers can be used individually or as a mixture.

The moulding composition of the invention can be produced in various ways. By way of example, the dispersion of the core-shell-shell particle I. can be mixed with an aqueous dispersion of the blend component and the mixture can be coagulated, the aqueous phase can be removed, and the coagulate can be fused to give a moulding composition. This process can achieve particularly uniform mixing of the two compositions. The components can also be produced separately and isolated and mixed in the form of their melts or as powder or pellets and homogenized in a multiscrew extruder or on a roll mill.

It is preferable that the moulding composition of the invention has the following:

a. a Charpy impact resistance in accordance with ISO 179 of at least 40.0 kJ/m², preferably of at least 60.0 kJ/m², with preference of at least 80.0 kJ/m², at 23° C. and b. a haze in accordance with ASTM D1003 (1997) of at most 15.0% at 80° C., preferably of at most 10.0% at 80° C., with preference of at most 8.0% at 80° C., with more preference of at most 5.0% at 80° C.

This application also provides a moulded item which is obtainable from the moulding composition of the invention.

The moulding composition of the invention is particularly suitable for the production of moulded items, advantageously with wall thickness above 1 mm, for example extruded webs of thickness from 1 to 10 mm which give good results in punching processes and by way of example can be used for the production of printable panels for electrical devices, or for the production of high-quality injection mouldings, e.g. windows for motor vehicles. Thinner foils of, for example, thickness 50 μm can likewise be produced therefrom.

It is preferable that the moulded item of the invention has the following:

a. a Charpy impact resistance in accordance with ISO 179 of at least 40.0 kJ/m², preferably of at least 60.0 kJ/m², with preference of at least 80.0 kJ/m², at 23° C. and b. a haze in accordance with ASTM D1003 (1997) of at most 15.0% at 80° C., preferably of at most 10.0% at 80° C., with preference of at most 8.0% at 80° C., with more preference of at most 5.0% at 80° C.

By virtue of the properties of markedly reduced haze increase at elevated temperature which have surprisingly been found, the products are particularly suitable for applications such as lighting and glazing. When the products are used in lighting applications with signal colours, there is no likelihood of any shift of colour coordinates due to any increase in haze.

Another field of application that is available for the impact-modified PMMA of the invention is automobile glazing. The requirements for toughness combined with optical properties such as high transparency with very low haze are met even at elevated temperatures.

The invention therefore further provides the use of the moulding composition of the invention, and also the use of the moulded item of the invention.

In particular, it provides the use of the moulding composition of the invention for the production of glazing, preferably of glazing of motor vehicles and/or of rail vehicles, or of buildings or machines. It moreover preferably provides the use for the production of displays for communication devices, in particular for PDAs, for mobile telephones, or for cellphones, preferably smartphones; tablet PCs; TV devices; kitchen devices and other electronic devices. It alternatively provides the use for the production of lamp covers, preferably for room lighting systems or automobile lighting equipment.

In particular it further provides the use of the moulded item of the invention as glazing, preferably as glazing of motor vehicles and/or of rail vehicles, or of buildings or machines. It moreover preferably provides the use as displays for communication devices, in particular PDAs, mobile telephones, cellphones, preferably smartphones; tablet PCs; TV devices; kitchen devices and other electronic devices. It alternatively provides the use as lamp covers, preferably for room lighting systems or automobile lighting equipment.

The following examples are intended for further explanation of the invention.

EXAMPLES

Core-Shell-Shell Particle I

Inventive Example 1

Production of the Seed Latex

A seed latex was produced by emulsion polymerization of a monomer composition comprising 98% by weight of ethyl acrylate and 2% by weight of allyl methacrylate. The product comprised about 10% by weight of these particles of diameter about 20 nm in water.

Production of the Core-Shell-Shell Particles

All of the core-shell-shell particles described below were produced by emulsion polymerization in accordance with production specification A below (Inventive Examples IE1, IE2, IE3, IE4 and also IE5) and, respectively, production specification B below (Comparative Example CE1). The emulsions (i) to (iii) stated in Table 1 were used here.

Inventive Examples IE1, IE2, IE3, IE4 and IE5

Production of the Core-Shell-Shell Particles by Production Process A 1.711 kg of water were used as initial charge in a polymerization tank at 83° C. (internal tank temperature), with stirring. 1.37 g of sodium carbonate and seed latex were then added. The emulsion (i) was then metered into the system over 1 h. 10 min after feed of the emulsion (i) had ended, the emulsion (ii) was metered into the system over a period of about 2 h. About 60 min after feed of the emulsion (ii) had ended, emulsion (iii) was then metered into the system over a period of about 1 h. 30 min after feed of the emulsion (iii) had ended, the system was cooled to 30° C.

In order to separate the core-shell-shell particles, the dispersion was frozen at −20° C. over 2 days, and then thawed, and the coagulated dispersion was separated by way of a filter fabric. The solid was dried at 50° C. in a drying oven (duration: about 3 days). The particle size of the core-shell-shell particles (see Table 2) was determined with the aid of a Nano-sizer© N5 from Coulter, the particles here being measured in dispersion.

Comparative Example CE1

Production of the Core-Shell-Shell Particles by a Production Process B 1.711 kg of water were used as initial charge in a polymerization tank at 52° C. (internal tank temperature), with stirring, and 0.10 g of acetic acid, 0.0034 g of iron(II) sulphate, 0.69 g of sodium disulphite, and also the seed latex, were added. The emulsion (i) was then metered into the system over 1.5 h. 10 min after feed of the emulsion (i) had ended, 7.46 g of sodium disulphite dissolved in 100 g of water were added, and the emulsion (ii) was metered into the system over a period of about 2.5 h. About 30 min after feed of the emulsion (ii) had ended, 0.62 g of sodium disulphite dissolved in 50 g of water was then added, and the emulsion (iii) was metered into the system over a period of about 1.5 h. 30 min after feed of the emulsion (iii) had ended, the system was cooled to 30° C.

In order to separate the core-shell-shell particles, the dispersion was frozen at −20° C. over 2 days, and then thawed, and the coagulated dispersion was separated by way of a filter fabric. The solid was dried at 50° C. in a drying oven (duration: about 3 days). The particle size of the core-shell-shell particles (see Table 2) was determined with the aid of a Nano-sizer© N5 from Coulter, the particles here being measured in dispersion.

TABLE 1

Summary of the individual emulsions (all data in [g])

| | IE1 | IE2 | IE3 | IE4 | IE5 | CE1 |
|---|---|---|---|---|---|---|
| Seed latex Emulsion (i) | 93.00 | 58.00 | 28.00 | 20.00 | 16.00 | 5.00 |
| Water | 878.70 | 878.70 | 878.70 | 878.70 | 878.70 | 732.69 |
| Sodium persulphate | 0.70 | 0.70 | 0.70 | 0.70 | 0.70 | 0.51 |
| Aerosol OT75 | 5.60 | 5.60 | 5.60 | 5.60 | 5.60 | 4.67 |
| Methyl methacrylate | 1071.62 | 1071.62 | 1071.62 | 1071.62 | 1071.62 | 703.47 |
| Ethyl acrylate | 44.74 | 44.74 | 44.74 | 44.74 | 44.74 | 29.40 |
| Allyl methacrylate | 2.24 | 2.24 | 2.24 | 2.24 | 2.24 | 2.21 |
| Emulsion (ii) | | | | | | |
| Water | 606.90 | 606.90 | 606.90 | 606.90 | 606.90 | 628.65 |
| Sodium persulphate | 1.58 | 1.58 | 1.58 | 1.58 | 1.58 | 1.44 |
| Aerosol OT75 | 7.20 | 7.20 | 7.20 | 7.20 | 7.20 | 7.46 |
| Butyl acrylate | 1160.63 | 1160.63 | 1160.63 | 1160.63 | 1160.63 | 1219.72 |
| Styrene | 256.00 | 256.00 | 256.00 | 256.00 | 256.00 | 262.87 |
| Allyl methacrylate | 21.57 | 21.57 | 21.57 | 21.57 | 21.57 | 19.53 |
| Emulsion (iii) | | | | | | |
| Water | 404.30 | 404.30 | 404.30 | 404.30 | 404.30 | 381.56 |
| Sodium persulphate | 0.70 | 0.70 | 0.70 | 0.70 | 0.70 | 0.44 |
| Aerosol OT75 | 1.08 | 1.08 | 1.08 | 1.08 | 1.08 | 1.34 |
| Methyl methacrylate | 614.27 | 614.27 | 614.27 | 614.27 | 614.27 | 920.45 |
| Ethyl acrylate | 24.93 | 24.93 | 24.93 | 24.93 | 24.93 | 38.35 |

Blending of the Moulding Compositions

Inventive Examples 2, 3, 4, 5, 7, 8, 9 and 10 and Comparative Example 6

A low-molecular-weight moulding composition (LMC) with $M_w$ about 50000 g/mol was produced, composed of 85% by weight of methyl methacrylate units and of 15% by weight of methyl acrylate units.

The moulding composition Altuglas® HT 121 (Arkema, France), featuring high heat resistance, was also provided (high-TG moulding composition comprising methacrylic acid).

One of the following: a) a moulding composition based on polymethyl methacrylate, PLEXIGLAS® 7N (Evonik Industries AG, Darmstadt), optionally mixed with a proportion of the above low-molecular-weight moulding composition (LMC) and/or with a proportion of Altuglas® HT 121, or b) a moulding composition based on polymethyl methacrylate, PLEXIGLAS® 8H (Evonik Industries AG, Darmstadt) was blended with the respective core-shell-shell particles IE1-IE5 and, respectively, CE1 by means of an extruder where the moulding composition and, respectively, blended moulding composition used corresponded in each case to the (meth)acrylic polymer II. Table 2 documents the compositions of the individual inventive examples and of the comparative example.

4 kg of the respective (meth)acrylic polymer II. and 2450 g of the respective core-shell-shell particles I. (38% by weight) were weighed into a 10 l mixing vessel. The mixture was mixed intensively by means of a tumbling mixer for 3 minutes and then charged to the hopper of a Stork single-screw extruder with 35 mm screw diameter. The components were mixed at a melt temperature of 235° C., and strands were drawn off from the extruder die, cooled in the water bath and pelletized to give pellets of uniform grain size.

500 test specimens in accordance with ISO 294 were injection-moulded from the resultant pellets in a Battenfeld BA injection-moulding machine. In order to determine impact resistance, test specimens measuring 80×10×4 mm were injection-moulded at 250° C. In order to determine optical properties, 65×40×3 mm plaques were injection-moulded at a melt temperature of 250° C.

Testing of the Moulding Compositions

Test specimens were produced from the blended moulding compositions. The moulding compositions or the corresponding test specimens were tested in accordance with the test methods below:

Vicat softening point (B50, 16 h/80° C.): DIN ISO 306 (August 1994)
Charpy impact resistance: ISO 179 (1993)
Modulus of elasticity: ISO 527-2
Transmittance (D 65/10°): DIN 5033/5036 Haze (BYK Gardner Hazegard-plus hazemeter): ASTM D1003 (1997)
MVR (230° C., 3.8 kg): ISO 1133

Table 2 shows the results of the tests. The advantages of the blends of the invention are clearly seen in comparison with the conventionally impact-modified moulding compositions of Comparative Example 6. Even at relatively high temperature (80° C.), the blends of the invention have low haze values of less than 5%, determined in accordance with ASTM D1003. However, the moulding compositions of the invention are similar to the known moulding compositions (Comparative Example 6) in providing a level of toughness and in providing impact resistance, without any impairment of the other important properties of the moulding composition, in particular the Vicat softening point and the modulus of elasticity. Some of the values obtained for these properties are actually better than those for the known moulding compositions (cf. inventive example 10).

TABLE 2

Test results for the impact-modified moulding compositions (on blending with 38% by weight of core-shell-shell particles I. in (meth)acrylic polymer II.

| | Inventive Example 2 | Inventive Example 3 | Inventive Example 4 | Inventive Example 5 | Comparative Example 6 |
|---|---|---|---|---|---|
| Core-shell-shell particles | IE1 | IE2 | IE3 | IE4 | CE1 |
| Moulding composition | 7N | 7N | 7N | 8H | 7N |
| Particle radius [nm] | 72 | 88 | 101 | 116 | 165 |
| Vicat [° C.] | 97.5 | 97.8 | 97.9 | 99.6 | 99.6 |
| Charpy IR @ 23° C. [kJ/m$^2$] | 49.4 | 71.3 | 91.5 | 96.7 | 95.9 |
| Light transmittance | 91.3 | 91.4 | 91.5 | 91.3 | 91.0 |
| Haze @ 23° C. [%] | 0.71 | 0.56 | 0.68 | 1.3 | 1.9 |
| Haze @ 60° C. [%] | 1.35 | 1.22 | 1.57 | 5.4 | 5.2 |
| Haze @ 80° C. [%] | 2.04 | 2.34 | 3.71 | 11.8 | 22.4 |
| Modulus of elasticity [MPa] | 2043 | 1946 | 1943 | 2220 | 1828 |
| MVR [cm$^3$/10 min] | 1.00 | 1.16 | 1.59 | 0.5 | 1.83 |

| | Inventive Example 7 | Inventive Example 8 | Inventive Example 9 | Inventive Example 10 |
|---|---|---|---|---|
| Core-shell-shell particles | IE3 | IE3 | IE3 | IE5 |
| Moulding composition | 7N + 10% by wt. of LMC | Altuglas ® HT 121 | Altuglas ® HT 121 + 10% by wt. of LCM | 7N |
| Particle radius [nm] | 101 | 101 | 101 | 122 |
| Vicat [° C.] | 95.9 | 106.7 | 105.6 | 96.1 |
| Charpy IR @ 23° C. [kJ/m$^2$] | 92.3 | 89.4 | 62.8 | 107.9 |
| Light transmittance | 91.0 | 90.8 | 89.9 | 91.5 |
| Haze @ 23° C. [%] | 1.1 | 1.4 | 1.4 | 0.9 |
| Haze @ 60° C. [%] | 2.1 | 4.5 | 4.8 | 5.6 |
| Haze @ 80° C. [%] | 4.6 | 8.4 | 8.5 | 9.7 |
| Modulus of elasticity [MPa] | 1923 | 2191 | 2097 | 1875 |
| MVR [cm$^3$/10 min] | 2.35 | 0.53 | 0.88 | 1.68 |

FIG. 1 shows the test results for Charpy impact resistance and haze values at 23° C., and also at 80° C., for the impact-modified moulding compositions (on blending with 38% by weight of core-shell-shell particles I. in the respective moulding composition) for Inventive Examples 2, 3, 4 and 10, and also Comparative Example 6.

The markedly reduced haze increase of the moulding compositions of the invention at elevated temperature can be seen from FIG. 1 and also from Table 2, and they are therefore suitable for applications such as lighting and glazing. In particular, compliance has been achieved with the requirements placed upon automobile glazing: toughness combined with optical properties such as high transparency with very low haze even at elevated temperatures. Inventive Example 7 reveals the effect of the addition of the low-molecular-weight (meth)acrylic polymer or the flow improver via the significant change of MVR in comparison with Comparative Example 6 and the other Inventive Examples.

The invention claimed is:

1. A moulding composition comprising respectively, based on its total weight:
   I. from 10.0 to 50.0% by weight of a core-shell-shell particle having a core, a first shell, and a second shell, produced by the process comprising a) employing water and an emulsifier as an initial charge,
b) adding to the initial charge from 20.0 to 45.0 parts by weight of a first composition comprising:
   A) from 50.0 to 99.9 parts by weight of alkyl methacrylates having from 1 to 20 carbon atoms in the alkyl moiety,
   B) from 0.0 to 40.0 parts by weight of alkyl acrylates having from 1 to 20 carbon atoms in the alkyl moiety,
   C) from 0.1 to 10.0 parts by weight of crosslinking monomers, and
   D) from 0.0 to 8.0 parts by weight of styrenic monomers of formula (I)

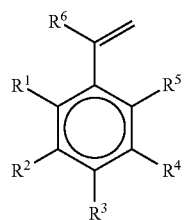

(I)

wherein moieties $R^1$ to $R^5$ are each independently hydrogen, a halogen, a $C_{1-6}$-alkyl group, or a $C_{2-6}$-alkenyl group, and moiety $R^6$ is hydrogen or an alkyl group having from 1 to 6 carbon atoms, to obtain a first mixture, and polymerizing the first mixture until conversion is at least 85.0% by weight, based on the total weight of components A), B), C), and D),
c) adding to the first mixture from 35.0 to 55.0 parts by weight of a second composition comprising:
   E) from 80.0 to 100.0 parts by weight of (meth) acrylates,
   F) from 0.05 to 5.0 parts by weight of crosslinking monomers, and
   G) from 0.0 to 25.0 parts by weight of styrenic monomers of formula (I) to obtain a second mixture, and polymerizing the second mixture until conversion is at least 85.0% by weight, based on the total weight of components E), F) and G),
d) adding to the second mixture from 10.0 to 30.0 parts by weight of a third composition comprising:
   H) from 50.0 to 100.0 parts by weight of alkyl methacrylates having from 1 to 20 carbon atoms in the alkyl moiety,
   I) from 0.0 to 40.0 parts by weight of alkyl acrylates having from 1 to 20 carbon atoms in the alkyl moiety, and
   J) from 0.0 to 10.0 parts by weight of styrenic monomers of formula (I) to obtain a third mixture, and polymerizing the third mixture until conversion is at least 85.0% by weight, based on the total weights of components H), I), and J),
   and wherein the stated parts by weight of the compositions b), c), and d) represent a total of 100.0 parts by weight, wherein the relative proportions of all the substances A) to J) provide, after polymerizing the third mixture, the core-shell-shell particles with a total radius, measured by the Coulter method, in the range of 70.0 to 125.0 nm, wherein the core, the first shell, and the second shell comprise compositions b), c), and d), respectively;

II. from 1.0 to 90.0% by weight of at least one (meth) acrylic polymer,
III. from 0.0 to 45% by weight of styrene-acrylonitrile copolymers, and
IV. from 0.0 to 10.0% by weight of additives,
   wherein II. or mixture of II., III., and/or IV. provide a measurement in accordance with ASTM D542 a refractive index that differs from the refractive index of I. by no more than 0.01 unit.

2. The moulding composition according to claim 1, wherein in the process in accordance with I. each polymerization is carried out at a temperature in the range from above 60° C. to below 90° C. or each polymerization is initiated by a redox initiator system.

3. The moulding composition according to claim 1, wherein in the process for obtaining I. the polymerization in the steps b) to d) is initiated with a peroxodisulphate.

4. The moulding composition according to claim 1, wherein the moulding composition
   has a Charpy impact resistance in accordance with ISO 179 of at least 40.0 kJ/m² at 23° C. and
   has a haze in accordance with ASTM D1003 (1997) of at most 15.0% at 80° C.

5. The moulding composition according to claim 1, wherein the process for obtaining I. employs, as initial charge, from 90.00 to 99.99 parts by weight of water and from 0.01 to 10.00 parts by weight of emulsifier, where the stated parts by weight give a total of 100.00 parts by weight.

6. The moulding composition according to claim 1, wherein the process for obtaining I. employs, as the emulsifier, an anionic emulsifier or a non-ionic emulsifier.

7. The moulding composition according to claim 1, wherein the at least one (meth)acrylic polymer according to II. comprises, in each case based on its total weight,
   a) from 52.0 to 100.0% by weight of alkyl methacrylate units having from 1 to 20 carbon atoms in the repeating alkyl moiety,
   b) from 0.0 to 40.0% by weight of alkyl acrylate units having from 1 to 20 carbon atoms in the repeating alkyl moiety and
   c) from 0.0 to 8.0% by weight of repeating styrenic units of formula (I),
   wherein the percentages by weight obtain a total of 100.0% by weight.

8. The moulding composition according to claim 1, wherein the moulding composition comprises styrene-acrylonitrile copolymers in accordance with III., wherein the styrene-acrylonitrile copolymers were obtained by polymerization of a mixture comprising
   from 70 to 92% by weight of styrene,
   from 8 to 30% by weight of acrylonitrile and
   from 0 to 22% by weight of other comonomers, based in each case on the total weight of the mixture.

9. The moulding composition according to claim 1, wherein the moulding composition comprises, based on its total weight, as additive in accordance with IV., from 0.1 to 10.0% by weight of another polymer which has a weight-average molecular weight that is higher by at least 10% than that of the at least one (meth)acrylic polymer according to 11.

10. A moulded item obtained from the moulding composition according to claim 1.

11. The moulded item according to claim 10, wherein the moulded item
   has a Charpy impact resistance in accordance with ISO 179 of at least 40.0 kJ/m² at 23° C. and has a haze in accordance with ASTM D1003 (1997) of at most 15.0% at 80° C.

12. The moulding composition according to claim 1, wherein the composition is suitable for the production of glazing.

13. The moulded item according to claim 10, wherein the item is suitable as glazing.

14. The moulding composition according to claim 1, wherein the composition is suitable for the production of displays for communication devices, for mobile telephones, or for cellphones; tablet PCs; TV devices; kitchen devices and other electronic devices.

15. The moulded item according to claim 10, wherein the item is suitable as display for a communication device, a mobile telephone, a cellphone; a TV device; a tablet PC; a kitchen device or any other electronic device.

16. The moulding composition according to claim 1, wherein the composition is suitable for the production of lamp covers.

17. The moulded item according to claim 10, wherein the item is suitable as a lamp cover.

* * * * *